Sept. 15, 1970  T. G. MATICH, JR  3,528,691

KEYWAY LOCK

Filed May 27, 1969

INVENTOR.
THOMAS G. MATICH, JR.

United States Patent Office 3,528,691
Patented Sept. 15, 1970

3,528,691
KEYWAY LOCK
Thomas G. Matich, Jr., McKeesport, Pa., assignor to Koppers Company, Inc., a corporation of Delaware
Filed May 27, 1969, Ser. No. 828,229
Int. Cl. F16d 1/06
U.S. Cl. 287—52.05  1 Claim

ABSTRACT OF THE DISCLOSURE

A key comprises two cooperating members and a fastener passing through an aperture in each member for urging the members to slide obliquely in respect of each other. Each member has an end surface, three side surfaces, and a sliding surface that is oblique to the end surface and one side surface. An aperture passes through each member and begins at the end surface as a circular opening and terminates at the sliding surface at an opening having semicircular ends and parallel sides. The circular openings on the end surfaces are countersunk to form a spherical contour. The fastener comprises a spherical head, engaging a countersunk surface of one member, a threaded shank connected to the spherical head, and a spherical nut engaging the shank and engaging a countersunk surface of another member.

BACKGROUND OF THE INVENTION

This invention relates to an apparatus for use in a keyway for the locking together of machine elements and, more particularly, to a locking key that has a wide range of adjustments.

Key and keyway arrangements are well known in the art for locking the machine parts together, such as a gear and a shaft. Mutual and cooperative grooves are cut into the gear and the shaft respectively to define the keyway. Conventionally, a key, either comprising a single block or several blocks, is wedged into the keyway for locking the machine parts together.

DESCRIPTION OF THE PRIOR ART

A key comprising two coacting blocks that are capable of sliding in respect of each other along a mating surface that is cut obliquely to three major mutual perpendicular axes whereby the key is capable of expanding into a keyway is disclosed in U.S. Pat. No. 2,497,634. The key locks a gear onto a shaft. As long as the shaft is rotating a force is exerted upon these blocks in a direction that is substantially perpendicular to the mating surface. This force causes a relative sliding motion of the blocks to increase the cooperation between the key blocks to hold them in firm engagement with the keyway. When the shaft is not rotating, however, the blocks become less firmly engaged with each other and, consequently, with the keyway. In an earlier U.S. Pat. No. 1,612,769 a screw-threaded shaft passes through three wedge-shaped blocks (formed by passing two planes inclined in respect of two major mutual perpendicular axes of the blocks) to move the blocks along the inclined planes to fill the keyway. Centrally disposed circular openings in the blocks allow the shaft to move relative to the blocks as the key is expanded but the expansion of the key is limited by the diameter of the circular opening.

On the other hand the novel key of my invention is capable of a wide range of adjustments. The cooperation of my key with the keyway does not depend on the rotation of any machine elements. The expansion of my novel key is not limited by centrally disposed circular apertures.

SUMMARY OF THE INVENTION

In accordance with the invention, a key for use in a keyway having a generally rectangular cross section comprises two blocks that are assembled together in an overlapping relationship with each other within the keyway. Each block has right dihedral angles to conform to the interior corners of the keyway; three dihedral elements for contacting the adjacent portions of the interior wall area of the keyway; a sliding surface in the overlapping region of the blocks defined by a plane that is skewed in respect of two major mutual perpendicular axes of the key; and, an end surface on the blocks that meets the slidable surface and the dihedral elements. An aperture passes through each block starting from a circular opening at the end surface and terminating at the slidable surface at an opening having parallel sides and semicircular ends. The circular openings are countersunk to define a spherical surface. A bolt passes through the apertures of each block. The bolt includes a spherical head that engages the spherical countersunk surface of one block, and a spherical nut that engages the bolt and that engages the spherical countersunk surface of the other block whereby the blocks are urged together in a skew sliding and a key wall engaging relationship.

DETAILED DESCRIPTION

Figure 1:
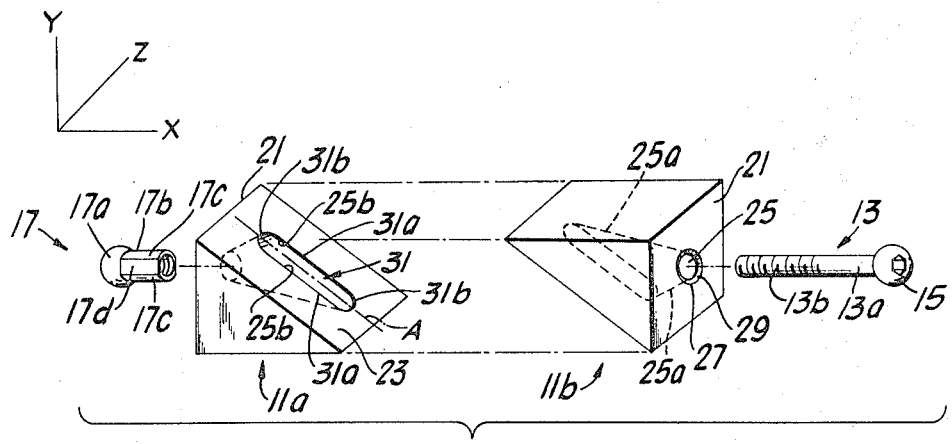
FIG. 1 illustrates an embodiment of the invention in an exploded perspective view.

The key of FIG. 1 comprises two coacting elongate blocks (11a and 11b), a fastener or bolt 13 having a spherical head 15 for cooperation with one block 11b and having a spherical nut 17 for engagement with the bolt 13 and for cooperation with the other block 11a.

Each block (11a and 11b) has associated therewith Cartesian coordinates, designated as the x, y, and z axes, for purposes of aiding the description of the present invention. Each block (11a and 11b) has an end surface 21 and a mating or sliding surface 23. The end surface 21 lies substantially in the y–z plane and, it is substantially planar; however, the end surface 21 may be oblique to any major plane and its contour is not necessarily restricted to a planar surface. The mating surface 23 is oblique and inclined to the end surface 21 in respect of two major axes, namely the y-axis and the x-axis of FIG. 1.

An aperture 25 passes through each block 11a and 11b, starting from a circular opening 27 on the end surface 21. From the circular opening 27 the aperture converges toward the central axis thereof to define a countersunk surface 29 having a generally spherical contour. From the countersunk surface 29 the aperture diverges in respect of a major axis thereof to provide semicircular end walls 25a and parallel sidewalls 25b. The aperture 25 terminates at an opening 31 at the mating surface 23 having parallel sides 31a and semicircular ends 31b. The major axis of the opening 31, designated as A in FIG. 1, must be aligned with the direction of incline of the mating surface 23 to allow the blocks 11a and 11b to slide in respect of each other.

The bolt 13 passes through the apertures 25 of both blocks (11a and 11b) for holding and urging the blocks together. The bolt or fastener 13 comprises a shank 13a having threads 13b at one end and attached to the other end thereof a spherical head 15 for engagement with the countersunk surface 29 of the block 11b. The purpose of the spherical head 15 is to permit the bolt 13 to freely rotate when the spherical head 15 engages the countersunk surface 29, a primary advantage of the present invention.

The spherical nut 17 comprises a spherical portion 17a for engaging the countersunk surface 29 of the other block 11a and an elongate tubular portion 17b attached to the spherical portion 17a. The outer surface of the tubular portion 17b conforms to oppositely disposed semicircular surface portions 17c that meet oppositely disposed parallel planar surface portions 17d. The planar surface portion 17d of the tubular portion 17b engages the adjacent parallel sidewalls 25b of the aperture 25 whereby the spherical nut 17 is prevented from revolving within the aperture; yet, the spherical nut 17 is capable of pivoting within the aperture 25 in the y–x plane as illustrated in FIG. 1. The tubular portion 17b is internally threaded for engaging the threaded shank of 13b of the bolt 13.

Figure 2:
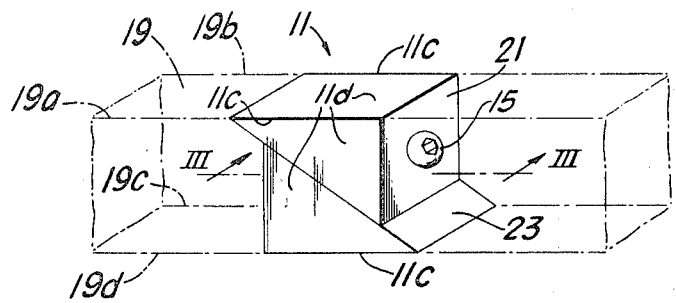
FIG. 2 is a perspective view of the completely assembled structure of FIG. 1.

In FIG. 2 the blocks (11a and 11b) are placed together to form an expandable key 11 with a generally rectangular cross section that coacts with a generally rectangular keyway 19, illustrated in phantom lines.

The assembled blocks (11a and 11b) have right dihedral angles 11c that are placeable along the interior corners (19a, b, c, and d) of the keyway. Dihedral elements 11d are thereby formed on all sides of the key 11, when assembled, for contacting the interior wall area of the keyway 19.

When the blocks are in their assembled position of FIG. 2 the mating surfaces 23 of each block abut one another and the blocks are thereby capable of sliding in respect of each other in an overlapping relationship within the cross section of the keyway 19. As the bolt 13 is revolved the blocks (11a and 11b) move in the direction of the incline of the mating surface 23 or move obliquely relative to each other so that the blocks slide on their mating surfaces 23 to change the dimensions of the key.

Figure 3:
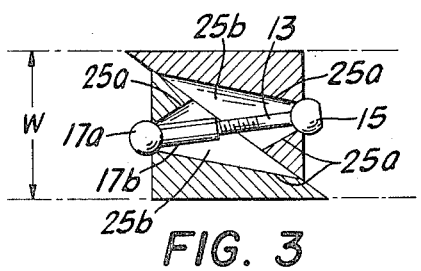
FIG. 3 is a sectional view of the key taken along line III—III of FIG. 2.

In FIG. 3, the blocks are held and urged together by the bolt 13 and the coacting spherical nut 17 where the blocks (11a and 11b) overlap each other to provide a width (w) that substantially fills the cross section of the keyway 19.

Figure 4:
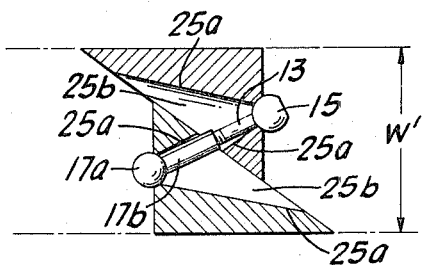
FIG. 4 is a sectional view of the key of FIG. 2 in a completely expanded position.

FIG. 4 illustrates the key 11 in its most extreme expanded position having a new width (w') greater than the width of the key of FIG. 3. The shank 13a of the bolt and the tubular portion 17b of the spherical nut 17 engages the aperture 25 at the semicircular ends 25a. Because of the engagement of the countersunk surfaces 29 with the spherical head 15 and with the spherical nut 17, the bolt 13 is capable of freely pivoting in the aperture 25 of the blocks as the blocks slide in respect of each other until the shank 13a and the tubular portion 17b engages the limits of the aperture 25a. Those skilled in the art will readily recognize that the semicircular ends 25a of the aperture 25 in FIG. 1 may be separated apart a greater distance to provide a wider range of adjustments to which my novel key may expand.

Thus, the novel key of this invention permits a wide range of adjustments as the blocks (11a and 11b) are capable of a skew sliding relationship i.e. sliding along the skewed mating surfaces 23 and are capable of key wall engaging relationship.

What is claimed is:
1. A key comprising:
   (a) two cooperating members of generally rectangular cross section for coacting with the keyway of generally rectangular cross section;
   (b) each member comprising:
      (i) an end surface and three side surfaces, each side surface being normal to said end surface,
      (ii) a sliding surface that is normal to two opposite side surfaces and that is oblique in respect of the end surface and one side surface,
      (iii) a tapered aperture that beings at the end surface as a circular opening comprised of two joined semicircular openings of equal radius that converge toward the axis of said aperture to form a countersunk surface having a generally spherical contour; said semicircular openings diverging thereafter toward said sliding surface as the aperture approaches said sliding surface to provide said aperture with semicircular end walls and parallel sidewalls; said aperture terminating at an opening at the sliding surface having semicircular ends and parallel sides; and
   (c) a fastener passing through said aperture comprising:
      (i) a spherical head engaging the countersunk surface of one member,
      (ii) a threaded shank connected to said spherical head, and
      (iii) a spherical nut comprising a spherical portion that engages the countersunk surface of the other member; and a tubular portion connected to said spherical portion having internal threads engaging the threaded shank of said fastener; said tubular portion having opposite semicircular surfaces meeting opposite parallel planar surfaces of said tubular portion; said planar surfaces engaging the adjacent parallel sidewalls of said aperture so that said nut is prevented from rotating within said aperture, yet is capable of pivoting therein whereby revolving said fastener moves said member obliquely relative to each other so that the members slide upon said sliding surface to change the dimensions of said key.

References Cited

UNITED STATES PATENTS

| | | |
|---|---|---|
| 459,733 | 9/1891 | Barber. |
| 943,209 | 12/1909 | White. |
| 1,295,937 | 3/1919 | Stafford et al. _____ 85—9 |
| 1,612,769 | 12/1926 | O'Connell. |
| 2,177,138 | 10/1939 | Hollander _____ 85—79 |

FOREIGN PATENTS 1,390,442  1/1965  France.

DAVID J. WILLIAMOWSKY, Primary Examiner

A. KUNDRAT, Assistant Examiner

U.S. Cl. X.R.

85—79